FIG. I
ELECTROPHORETIC PATTERN (DIAGRAMATIC)
IN 5% PYRIDINE / 0.5% ACETIC ACID pH = 6.0
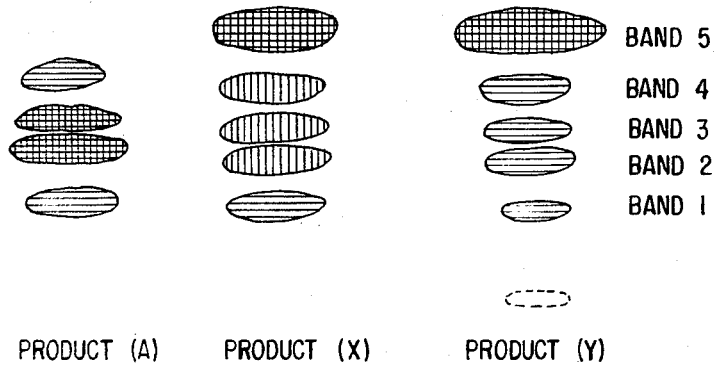
FIG. 2
ELECTROPHORETIC PATTERN (DIAGRAMATIC)
IN 5% PYRIDINE / 0.5% ACETIC ACID pH = 6.0
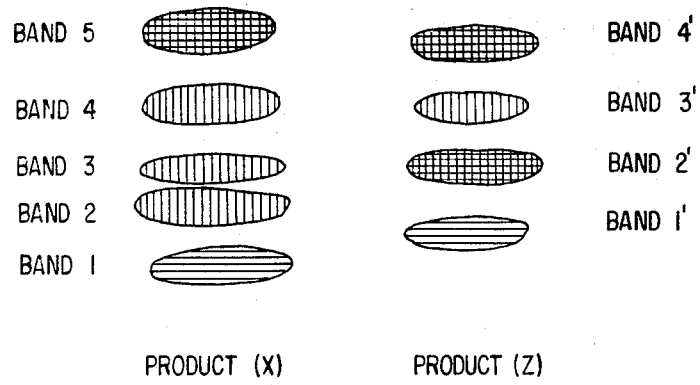
INVENTORS.
JULIAN GAGOLSKI
BERNARD LILIENTHAL United States Patent Office 3,471,613
Patented Oct. 7, 1969

3,471,613
METHOD OF AND COMPOSITION FOR
INHIBITING DENTAL EROSION
Julian Gagolski, Chatswood, New South Wales, Australia, and Bernard Lilienthal, Stanmore, England, assignors to The Colonial Sugar Refining Company Limited, Sydney, New South Wales, Australia, a company of New South Wales, Australia
Continuation-in-part of application Ser. No. 195,310, May 16, 1962. This application Mar. 22, 1966, Ser. No. 536,442
Claims priority, application Australia, Mar. 24, 1965, 56,755/65
Int. Cl. A61k 5/00
U.S. Cl. 424—57         15 Claims The present invention is a continuation-in-part of United States patent application by Gagolski and Lilienthal, Ser. No. 195,310, filed May 16, 1962.

The invention relates to orally acceptable compositions of matter containing cariostatic agents and the application of these compositions to the teeth for the purpose of inhibiting the cariogenic effect, viz the production of dental erosion and dental caries.

More particularly, the invention provides orally acceptable compositions of matter containing cariostatic agents for the purpose of inhibiting the effect of cariogenic foodstuffs on the teeth. The term "orally acceptable composition of matter" used herein means a composition of matter suitable for oral intake (for example, a foodstuff or dentifrice) and the term "cariogenic foodstuff" used herein means a foodstuff made of or including a carbohydrate.

THEORETICAL BACKGROUND

Some factors concerning the cariogenic effect have been generally recognized and accepted by the dental profession. Chief among these factors are:

(1) Bacteria which produce acids (for example, bacteria of the Lacto-bacillus species which produce lactic acid) are present in the oral cavity in large numbers when dental caries is prevalent.

(2) Particles of cariogenic foodstuffs impacted against dental surfaces provide a favourable substrate for the formation of such acids in the oral cavity.

(3) Acids formed in the oral cavity attack and dissolve some of the constituents of teeth — in particular, hydroxyapatite (a calcium phosphate comprising the major part of dental enamel)—rendering the teeth more prone to erosion and caries.

The cariogenic effect of acids formed in the oral cavity results from the cumulative effect of direct and usually prolonged contact between the acids and the dental surface. Authorities are not in complete agreement as to the exact mechanism of the cariogenic effect, but it is known that in the mouth or in vitro, these acids cause softening and erosion of the dental enamel—a destructive process which is a precursor of dental caries.

It is also known that the cariogenic effect of these acids is inhibited in the presence of certain substances herein referred to as "cariostatic agents." Some cariostatic effects which have been recognized by the dental profession are:

(1) Solutions containing certain soluble inorganic phosphates, e.g. sodium or ammonium phosphate, inhibit acid attack.

(2) Metastable solutions containing both dissolved calcium and phosphate reharden acid-softened human dental enamel; fluoride accelerates this process.

These cariostatic effects are known to take place in the mouth or in vitro, and while the mechanism is not certain, there is apparently a local physico-chemical reaction involving the cariostatic agent and the dental surface. For this reason, maximum inhibition of dental caries must occur when cariostatic agents are introduced to dental surfaces simultaneously with cariogenic agents.

Ideally therefore, cariostatic agents should be incorporated in cariogenic foodstuffs. Only then can they be present in the proper location at the proper time to inhibit the cariogenic effect most successfully. Nevertheless, since there is a time lag between the application of cariogenic foodstuffs to the teeth, the formation of acids in the oral cavity and the onset of the cariogenic effect, it is apparent that cariostatic agents must also be effective (though with less than maximum benefit) when administered to the teeth in dentifrices and other non-cariogenic carriers.

For one reason or another, most (if not all) of the heretofore known cariostatic agents cannot be considered for incorporation in foodstuffs. Thus, fluorides have known cariostatic effects but are generally toxic and the level of their concentration in foodstuffs must be closely and carefully controlled. The toxicity of fluorides is again a reason why fluoridation of drinking water—which results in a practically infinitesimal fluoride content (1 p.p.m.)—has not received general acceptance. Again, the soluble phosphates of inter alia sodium, ammonium and magnesium, are objectionable on account of their very strong and distinctive tastes. As a result, palatability characteristics are adversely affected when these agents are present in foodstuffs in cariostatically effective concentrations. Likewise, stable forms of calcium phosphate—possibly effective under some conditions—have two disadvantages which tend to prevent their successful use in foods: (i) they have, like sodium phosphate, an adverse taste, (ii) they are only slightly soluble in water under physiological conditions of pH.

Almost invariably, crude carbohydrates incorporate calcium and phosphorus as an association of both organic and inorganic calcium phosphates. For example, sugar cane stalks and sugar beet roots contain about 0.15% by weight calcium and about 0.15% by weight phosphorus (percentages based on the weight of sucrose they contain). The major part of this calcium and phosphorus is water-soluble, and about one third of the phosphorus is in the form of organic phosphates.

More than 95% of each of the naturally occurring calcium and phosphorus components are removed during the production of refined sugar. Similarly, high percentages of calcium and phosphorus are lost during the refining of wheat to white flour. Refined carbohydrates are generally regarded as more cariogenic than crude carbohydrates, and a reason for this is possibly related to the loss of calcium and phosphorus which occurs during refining.

One of the objects of the present invention is to provide orally acceptacle compositions of matter containing a soluble, non-toxic, palatable cariostatic agent consisting of sugar phosphates.

A more particular object of the invention is to provide orally acceptable compositions of matter containing a soluble, non-toxic, palatable cariostatic agent consisting of calcium sugar phosphates.

Another object of the invention is to provide orally acceptable compositions of matter containing a soluble, non-toxic, palatable cariostatic agent consisting of a complex association of sugar and inorganic phosphates.

Another more particular object of the invention is to provide orally acceptable compositions of matter containing a soluble, non-toxic, palatable cariostatic agent consisting of a complex association of calcium sugar phosphates and inorganic calcium phosphate.

Yet another object of the invention is to provide orally acceptable compositions of matter comprising a cariostatic agent and a carrier therefor consisting of a foodstuff.

Yet another object of the invention is to provide orally acceptable compositions of matter comprising a cariostatic agent and a carrier therefor consisting of a toothpaste.

Still another object of the invention is to provide a method of inhibiting the softening and erosion of dental enamel when subject to the action of cariogenic foodstuffs.

Other objects of the invention will be apparent from the subsequent discussion.

We have now found that cariostatic calcium and phosphate can be provided by the calcium salts of sugar phosphates. We have also found that cariostatic calcium and phosphate can be provided by a complex association of calcium sugar phosphates and inorganic calcium phosphate having some properties markedly different from those of the individual components. These cariostatic agents are soluble, non-toxic and palatable and can all be incorporated in foods, beverages, toothpastes and other carriers without noticeably affecting flavour or other characteristics of the carrier. When added to refined carbohydrate foods, they restore to those foods calcium and phosphorus in a soluble, tasteless form similar to that in which these elements occur in crude carbohydrates.

Associations in aqueous solution involving ionized species can range from relatively simple complex formation to the more complicated ionic interactions occurring in complex coacervation and complex flocculation. These latter interaction phenomena are as yet but poorly understood, but they are known to depend to a very large extent on factors such as pH, concentrations of the interacting species (both absolute and relative), ionic strength and specificity of interaction.

Broadly, the present invention includes a method of inhibiting dental erosion and dental caries comprising applying to the teeth an orally acceptable composition of matter comprising a cariostatically effective amount of a soluble, non-toxic and palatable cariostatic agent in intimate admixture with a carrier therefor; said cariostatic agent being selected from the group consisting of a calcium sugar phosphate, mixtures of calcium sugar phosphates, and a complex association of two components (a) and (b) of which component (a) is selected from the group consisting of a calcium sugar phosphate and mixtures of calcium sugar phosphates and component (b) is an inorganic calcium phosphate and the association is such that at least 2% by weight of component (b) based on the weight of component (a) is soluble in water under ambient conditions when the total dissolved calcium sugar phosphate and inorganic calcium phosphate exceeds about 5 parts per 100 parts water by weight; said carrier being selected from the group consisting of toothpastes, tooth powders, liquid dentifrices, mouthwashes, edible pharmaceutical preparations (for example, prophylactic tablets and lozenges for sucking), foodstuffs and beverages.

The cariostatic agents and their preparation (1) Calcium sugar phosphates are known compounds whose preparation has been described inter alia by Neuberg in German Patent No. 247,809, issued June 6, 1912. This German patent describes a method—herein referred to as phosphorylation method (I)—for the preparation of the calcium salts of the phosphoric esters of sucrose or glucose by steps which include the phosphorylation of an aqueous solution of the sugar—say, sucrose—in the presence of an excess of calcium oxide relative to the stoichiometric amount given by the equation,

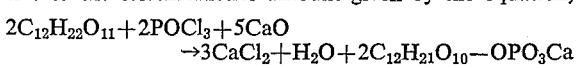

$2C_{12}H_{22}O_{11} + 2POCl_3 + 5CaO$
$\rightarrow 3CaCl_2 + H_2O + 2C_{12}H_{21}O_{10} - OPO_3Ca$ The following example, which we have repeated, illustrates the method described in the quoted specification:

A solution of 77 grams of phosphorus oxychloride in 250 millilitres of alcohol-free chloroform was slowly added to an ice-cold solution of 180 grams of sucrose in 2,000 millilitres of water in which 115 grams of calcium oxide had been slaked and suspended. After stirring for several hours, the solution was filtered and carbon dioxide was passed into the filtrate to remove excess calcium oxide as carbonate. The filtered solution was then concentrated and added to alcohol to precipitate a calcium sucrose phosphate product containing calcium chloride. To obtain a product free from calcium chloride, this precipitated material was dissolved in water and precipitated with alcohol five or six times.

The final product prepared by this detailed method is hereinafter referred to as product (A).

Applying conventional techniques, we have found that the partial analysis of a particular batch of product (A) was as follows (percentages based on the dry weight of the product):

| | Percent |
|---|---|
| Calcium | 8.1 |
| Total phosphorus | 6.8 |
| Inorganic phosphorus | 0.05 |

The product thus contains only about 0.25% by dry weight of an inorganic calcium phosphate. It is readily soluble in water and the solution is stable at almost all concentrations.

When polyhydroxy compounds such as sugar are phosphorylated, any one or a number of hydroxyl groups are likely to be esterified, and—as demonstrated hereunder—the sucrose phosphate component of product (A) is extremely complex.

Zone electrophoresis (paper) is an important technique which we have applied to assist in identifying the components both of product (A) and of other products usable as cariostatic agents according to the invention. The technique may be practiced with a variety of buffers, pH values, concentrations and voltage gradients. The relative mobilities of the various components are dependent on these parameters and typical conditions which we have found useful are the following:

buffer—5% pyridine, 0.5% glacial acetic acid in water, pH=6.0
paper—Whatman No. 54
voltage gradient—16 volts/centimetre
time for separation—2 to 2½ hours.

Location of the components on the paper after drying is indicated conveniently by applying an ammonium molybdate reagent which yields a blue color in the presence of phosphate.

FIGURES 1 and 2 of the annexed drawings give comparative electrophoretic patterns when a number of different products—product (A) and some complex products (X), (Y) and (Z) described hereinafter—were submitted to electrophoresis in equal amounts (the above specified conditions applying). It is seen that each product has a characteristic pattern of electrophoretic bands which serves to distinguish it from the other products.

Methods which we have employed for the characterization of various bands have involved conventional analysis, chromatography, infra-red spectrophotometry, neutron activation analysis, the determination of formula weights and the determination by X-ray diffraction of the nature of the inorganic phosphates produced when the substances are calcined at 800° C.

By such means, we have established that bands numbered 1 to 4 in the drawing are representative in all cases of various sucrose phosphate components. General confirmation of this fact is provided by elution of these bands from the electrophoretic separation followed by controlled hydrolysis in aqueous solution (by acids, alkalis or enzymes) to give free inorganic phosphate and the free sugars or their hydrolysis products.

The detailed characterizations which we have carried out on the sucrose phosphate components suggest that, for the particular product (A), the four bands 1 to 4 appear to be derived from the following types of sucrose phosphate present in the specified proportions:

Band 1 is derived from about 2% of the total dry weight of the product and appears to consist of disucrose phosphate anions of the type,

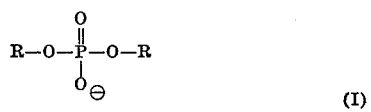
(I)

where R is the sucrose molecule minus one hydroxyl group.

Band 2 is derived from about 64% of the total dry weight of the product and appears to consist of sucrose monophosphate anions of the type,

(II)

where R is again the sucrose molecule minus one hydroxyl group. The sucrose monophosphate anions appear to be substituted at the glucose-2 position of the sucrose molecule.

Band 3 is derived from about 20% of the total dry weight of the product and appears to consist of a mixture of two sucrose phosphate anions, one of these being a sucrose monophosphate anion similar to type (II), and the other being a cyclic sucrose monophosphate anion of the type,

(III)

where R' is the sucrose molecule minus two hydroxyl groups.

Band 4 is derived from about 14% of the total dry weight of the product and appears to consist of sucrose monophosphate anions similar to type (II). In this case, the phosphate group appears to be substituted at the fructose-6 position of the sucrose molecule.

It will be understood that these bands do not necessarily relate to single pure compounds. By way of illustration, in some cases they may consist of several isomeric sucrose phosphates. The complexity of the phosphorylation product has prevented a complete identification of the molecular structure of each component.

Methods of producing specific single sugar phosphates are known, but are liable to remain prohibitively expensive for commercial use. This follows from the fact that the selective esterification of sugars is only possible when special methods are invoked, for example methods involving the use of enzymes or the reaction of substituted phosphoryl chlorides with sugar molecules carrying protected hydroxyl groups in appropriate positions. We have found, however, that it is unnecessary to produce specified single sugar phosphates for the purposes of the present invention and subsequent exemplification illustrates the use only of cariostatic agents comprising calcium sugar phosphates which are esterification mixtures.

Complex associations of calcium sugar phosphates and inorganic calcium phosphate are described by Curtin and Gagolski in United States patent application Ser. No. 414,074, filed Nov. 27, 1964, now U.S. Patent No. 3,375,-168 granted on Mar. 26, 1968; the latter is a continuation-in-part of United States patent application by Curtin and Gagolski, Ser. No. 262,230, filed Mar. 1, 1963, and now abandoned.

As will be explained more fully below, these complex associations can only be prepared by certain methods whose selection is not obvious from the existing body of knowledge regarding their components.

In organic calcium orthophosphates are known either to be relatively insoluble in water or to dissolve incongruently therein (that is, dissolution accompanied by reaction). An example of incongruent dissolution is provided by monocalcium phosphate, which dissolves in water but then undergoes hydrolysis to form the less soluble dicalcium phosphate. In general, it has been found that extended treatment of any calcium orthophosphate with excess water leads to the formation of an insoluble apatite.

On the other hand, calcium sugar phosphates are known to have comparatively high solubility in water. This high solubility is probably due to the hydrophilic nature of the sugar moiety to which the phosphate groups are attached. Generally speaking, we have observed that the higher the ratio of hydroxyl to phosphate on the sugar molecule the higher the water solubility of the salt. For example, the calcium salts of sucrose monophosphates are extremely soluble in water, the limit of their solubility being apparently set only by the very great increase in viscosity which occurs at high concentrations (e.g. solutions containing in excess of about 250 grams of salt per 100 grams of water). The calcium salts of glucose monophosphates are also readily soluble in water, though somewhat less so than the corresponding salts of sucrose monophosphates. However, the calcium salts of hexose diphosphates, e.g. fructose 1:6-diphosphate, are considerably less soluble.

When a product consisting essentially of calcium sucrose phosphates is mixed intimately by comminution with an inorganic calcium phosphate, the resulting material displays a solubility behaviour in water which is not noticeably different from the known behaviours of the components. The calcium sucrose phosphate component dissolves and the inorganic calcium phosphate component either remains undissolved or dissolves initially but ultimately precipitates.

The inorganic calcium phosphate can be dissolved, of course, by acidifying this aqueous mixture, but we have found, surprisingly, that—provided the concentrations of the two components fall within the limits hereinbefore defined—careful neutralization of the acidified mixture will not result in the precipitation of inorganic calcium phosphate. We have also found that precipitation fails to occur even when the pH is in excess of 7. At concentrations of calcium sucrose phosphates exceeding about 5% by weight of water, and at concentrations of inorganic calcium phosphate within the range of about 2% to about 25% by weight based on the weight of calcium sucrose phosphates, these neutralized solutions are stable for long periods. This result is unexpected since it is known that inorganic calcium phosphate is precipitated in neutral and alkaline solutions.

Dilution of the solution may effect a slow precipitation of inorganic calcium phosphate associated with some calcium sucrose phosphates. The precipitated material is highly dispersed and essentially amorphous; depending on concentration factors, it may form a gel or a viscous hazy solution. Reconcentration of the solution redissolves the precipitate.

The neutralized solution described above contains a cariostatic agent usable according to the invention, viz a complex association of calcium sucrose phosphates and normally water-insoluble inorganic calcium phosphate. Neutralized solutions comprising complex associations of inorganic calcium phosphate and other calcium sugar phosphates (e.g. calcium glucose phosphates) can be prepared in a similar way.

Thus, in general, we have found that the defined complex associations can be formed by a method—herein referred to as the acidification method—which includes the step of adding an appropriate base to an acidified aqueous solution comprising a sugar phosphate and an inorganic phosphate anion. The calcium cation can be provided either by the base or by the acidified solution.

Evidence indicates that the nature of this complex association is such that the inorganic phosphate component is more soluble in water at high concentrations of the sugar phosphate component than at low concentrations. Comparative studies also indicate that the inorganic component is more soluble in the presence of some calcium sugar phosphates (e.g. where the sugar is sucrose) than in the presence of an equal weight of some other calcium sugar phosphates (e.g. where the sugar is glucose).

These are reasons why, in the given definition of those cariostatic agents which consist of a complex association of components (a) and (b), the solubility of component (b) has been related at least to the case where the total dissolved phosphate content exceeds about 5 parts per 100 parts water by weight. Depending on the nature of the sugar phosphate or sugar phosphate mixture, only some of the complex associations are characterized in that at least 2% by weight of component (b) based on the weight of component (a) is soluble in water under ambient conditions when the total dissolved phosphate content of the solution does not exceed about 5 parts per 100 parts water by weight; however, all of the complex associations satisfy the defined condition.

In general, no definite upper limit can be assigned to the proportion by weight of component (b) which is soluble in water under ambient conditions when the total dissolved calcium sugar phosphate and inorganic calcium phosphate exceeds about 5 parts per 100 parts water by weight; usually the proportion of dissolved component (b) does not exceed 25% by weight based on the weight of dissolved component (a). The concentration-dependent solubility behaviour of cariostatic complexes usable in the invention obviously involves complex interaction between ionic species.

It is pertinent to note that these defined complex associations cannot be produced by some methods (for example, double decomposition reactions in solution) which would otherwise appear to be favoured by existing knowledge of the individual properties of the components. Thus, precipitation of inorganic calcium phosphate cannot be avoided (in alkaline solution) by dissolving in water a sugar phosphate salt and adding simultaneously dropwise thereto with vigorous stirring separate aqueous solutions comprising the following ingredients respectively: (i) a soluble inorganic phosphate salt, (ii) a soluble inorganic non-phosphate salt of calcium. Likewise, precipitation of inorganic calcium phosphate cannot be avoided (in alkaline solution) by dissolving in water the sugar phosphate salt of a cation whose inorganic phosphate is normally soluble in water (e.g. sodium, potassium, ammonium), together with the corresponding soluble inorganic phosphate salt, and adding dropwise thereto with vigorous stirring an aqueous solution comprising a soluble inorganic non-phosphate salt of calcium.

In a method alternative to the acidification method, we have found that the defined complex associations can be formed by phosphorylating a sugar under suitable conditions in the presence of an appropriate calcium base. A convenient and economical method—herein referred to as phosphorylation method (II)—includes the steps of mixing a sugar with water and an inorganic calcium oxy-compound selected from the group consisting of calcium oxide, calcium hydroxide and calcium carbonate, phosphorylating the mixture at low temperature with phosphorus oxychloride, and recovering the defined complex association from the reaction mixture; the method being characterized in that the sugar, inorganic calcium oxy-compound and phosphorus oxychloride are employed respectively in the molar proportions approximately 1:2.5:1.

When phosphorylating sugars according to this latter method, we have found that the proportion of inorganic phosphate in the product can be controlled during manufacture by manipulating such factors as: concentrations and rates of addition of reactants, temperature of reaction, degree of agitation and method of recovery of the product. For example, in the phosphorylation of sucrose in aqueous solution in the presence of lime by phosphorus oxychloride dissolved in trichlorethylene, control of variables in the following way leads to an increase in the proportion of inorganic phosphate in the product:

(1) increase in concentration of phosphorus oxychloride in trichlorethylene,
(2) increased rate of addition of phosphorus oxychloride in trichlorethylene during reaction,
(3) increase of temperature of reaction between 0° and 25° C.,
(4) decrease in degree of agitation during the reaction.

We give below specific examples of the preparation according to this method of three products—herein referred to as (X), (Y) and (Z)—comprising complex associations of calcium sugar phosphates and inorganic calcium phosphate usable as cariostatic agents according to the invention. As will be seen from the preparations of (X) and (Y), the proportion of inorganic phosphate in the product can also be altered by varying the method of recovery from the reaction mixture.

PRODUCT (X)

A solution of 127 kilograms of sucrose in 63.5 litres of water was mixed with 295 litres of water and 68 kilograms of slaked lime in a reaction vessel. Additional water was added to adjust the volume to 591 litres. The solution was cooled to 5° C. and maintained at this temperature for eight hours, during which period 54.5 kilograms of phosphorus oxychloride dissolved in 54.5 kilograms of trichlorethylene was gradually added with vigorous agitation. When reaction was complete, the mixture was centrifuged to remove suspended solids and trichlorethylene, then pumped to a glass lined vessel where 2,000 litres of denatured absolute alcohol was added with stirring to precipitate a crude product comprising a complex association of calcium sucrose phosphates and inorganic calcium phosphate. This precipitate was separated and leached with four separate volumes of 80% ethanol before being collected in a centrifuge and dried to a fine white powder, the final product.

Applying conventional techniques, we have found that the partial analysis of a particular batch of product (X) was as follows (percentages based on the dry weight of the product):

| | Percent |
|---|---|
| Calcium | 12.5 |
| Total phosphorus | 9.3 |
| Inorganic phosphorus | 2.8 |
| Loss of weight on drying | 11.0 |
| Loss of weight on ignition | 63.0 |

The product is a complex association of calcium sucrose phosphates and solubilised inorganic calcium phosphate, together with minor constituents characteristic of the reaction (e.g. traces of calcium chloride).

This product has been shown (by procedures previously outlined) to consist essentially of the following components in approximately the given proportions (percentages by weight based on the dry weight of the product): 85% essentially amorphous calcium salts of several sucrose phosphates, 15% inorganic calcium phosphate existing in the solid state essentially as an amorphous tricalcium orthophosphate, traces of free sucrose and calcium chloride.

Referring to FIGURE 1 or 2, product (X) is seen to be distinguished by five electrophoretic bands. Of these, band 5 is the fastest moving and corresponds to inorganic phosphate. Evidence indicates that the remaining bands 1 to 4 consist respectively of the previously described sucrose phosphate anion types and are derived from the following percentages of the total dry weight of the product: band 1—about 5%, band 2—about 35%, band 3—about 10%, band 4—about 35%.

The product is readily soluble in water and stable viscous solutions can be prepared containing as much as 70% by weight dissolved solids. These solutions contain about 19% by weight dissolved inorganic calcium phosphate (based on the weight of calcium sucrose phosphates present) and have pH values in excess of 7.

If the solutions are diluted with water to below about 10 parts total dissolved phosphates per 100 parts water by weight they may slowly precipitate insoluble matter consisting of inorganic calcium phosphate associated with some calcium sucrose phosphates. The form and composition of the precipitated material, the amount of precipitation and the rate of precipitation are all dependent inter alia on the concentration of the solution.

PRODUCT (Y)

This product was prepared by a modification of the phosphorylation procedure described for product (X). Instead of precipitating the reaction product after the reaction mixture had been centrifuged, a quantity of disodium hydrogen phosphate was added equivalent to the free chloride remaining in the reaction mixture. The resulting solution was then evaporated to dryness.

Applying conventional techniques, we have found that the partial analysis of a particular batch of product (Y) was as follows (percentages based on the dry weight of the product):

|  | Percent |
|---|---|
| Calcium | 10.5 |
| Total phosphorus | 8.6 |
| Inorganic phosphorus | 5.7 |

Product (Y) has been shown (by procedures previously outlined) to consist essentially of the following components in approximately the given proportions (percentages by weight based on the dry weight of the product): 35% calcium sucrose phosphates, 29% tricalcium phosphate, 17% free sucrose and 19% sodium chloride.

About 57% of this product is soluble in water at a total solids to water ratio of 1 to 5 by weight. The two phases have the following approximate compositions:

|  | Percent | |
|---|---|---|
|  | Soluble | Insoluble |
| Calcium sucrose phosphates | 18.9 | 15.7 |
| Tricalcium phosphate | 1.5 | 27.3 |
| Free sucrose | 17.4 |  |
| Sodium chloride | 19.2 |  |
| Total | 57 | 43 |

Thus, about 8% of tricalcium phosphate based on the weight of soluble calcium sucrose phosphates is soluble in water at a concentration of about 4% by weight total soluble inorganic and sucrose phosphates.

Referring to FIGURE 1, product (Y) is seen to be distinguished essentially by five electrophoretic bands, 1 to 5. These analyse similarly to the electrophoretic bands 1 to 5 for product (X). In the drawing for product (Y), the faint band below band 1 corresponds to free sucrose.

PRODUCT (Z)

90 grams of glucose was dissolved in 1.5 litres of water and 92.5 grams of calcium hydroxide was added to the solution. The mixture was then cooled to 0° C. and maintained at this temperature during a gradual addition thereto with vigorous agitation of 46 millilitres of phosphorus oxychloride dissolved in 75 millilitres of trichlorethylene. The reaction mixture was then stirred for an hour before being centrifuged to remove any undissolved material. The resulting liquid was then concentrated to approximately 40% solids and the reaction product was precipitated by the addition of ethanol to a concentration of about 90% by weight based on the weight of liquid. The product was isolated, redissolved and reprecipitated four times under similar conditions to remove soluble impurities (e.g. calcium chloride).

Applying conventional techniques, we have found that the partial analysis of a particular batch of product (Z) was as follows (percentages based on the dry weight of the product):

|  | Percent |
|---|---|
| Calcium | 10.7 |
| Total phosphorus | 11.5 |
| Inorganic phosphorus | 1.32 |

The product comprises essentially a complex association of calcium glucose phosphates and solubilised inorganic calcium phosphate.

This association has been shown (by procedures previously outlined) to consist essentially of the following components in approximately the given proportions (percentages based on the dry weight of the product): 90% essentially amorphous calcium salts of several glucose phosphates, and 7% inorganic calcium phosphate existing in the solid state essentially as an amorphous tricalcium orthophosphate.

FIGURE 2 of the annexed drawings gives comparative electrophoretic patterns for products (X) and (Z). The patterns are different, but both show the same fastest moving band of inorganic phosphate, identified as band 4' for (Z).

In the case of product (Z), by the use of the techniques mentioned earlier in connection with sucrose phosphates, the remaining bands 1' to 3' can be shown to correspond to glucose phosphate components. Evidence indicates that the major group of glucose phosphates present in the product (and corresponding to band 2') is composed of glucose monophosphates.

Product (Z) dissolves completely in water provided the resulting solution is sufficiently concentrated (e.g. 50% by weight total solids). The solution contains about 8% inorganic calcium phosphate component based on the weight of calcium glucose phosphates present and has a pH of about 7. When the solution is diluted to about 1 part total dissolved phosphates per 100 parts water by weight, it rapidly becomes cloudy due to the precipitation of finely dispersed insoluble material.

In the preparations of the cariostatic agents described above, the sugar phosphate component has been derived from sucrose or glucose. It will be understood, however, that exactly comparable methods may be employed to prepare cariostatic agents comprising calcium sugar phosphates derived from other sugars—e.g. arabinose, ribose, xylose, fructose, gelactose, lactose, maltose, raffinose, or any mixtures thereof.

EVIDENCE OF THE CARIOSTATIC EFFECT

In experiments leading to the present invention, a comprehensive program of research has been carried out to investigate the cariostatic behavior of (inter alia) calcium sugar phosphates and complex associations of calcium sugar phosphates and inorganic calcium phosphate.

This program has included experiments to ascertain the effect of these agents on (i) the solubility and rate of dissolution of hydroxyapatite and dental enamel, (ii) the softening and rehardening of dental enamel, (iii) the incidence of dental caries in rats firstly when the agents were applied to the teeth in a toothpaste and secondly when the agents were administered in foodstuffs.

Some of the results obtained from these laboratory experiments are given hereunder.

Dental authorities are in agreement that the formation of a carious lesion involves decalcification of dental enamel by the dissolution of hydroxyapatite from the dental surface. Since hydroxyapatite constitutes approximately 98% of dental enamel, any compound which can be shown by in vitro experiments to inhibit this dissolution must also have cariostatic activity in vivo.

Example 1

The agar plate technique (Lilienthal, B. and Reid, H., Arch, Oral Biol. 1, 125–132, 1959) was applied to determine the inhibiting effect of various sugar phosphates on the dissolution of finely divided hydroxyapatite by lactic acid. It was shown that the following sugar phosphate salts (inter alia) all inhibit this dissolution:

sodium sucrose phosphates
calcium sucrose phosphates
magnesium sucrose phosphates
calcium lactose phosphates
calcium maltose phosphates
calcium glucose-1-phosphates
magnesium glucose-1-phosphates
calcium glucose-6-phosphates
magnesium glucose-6-phosphates
calcium fructose-6-phosphates
calcium fructose-1,6-diphosphates Example 2

The dissolution of hydroxyapatite pellets in a solution at pH of 4.0 (potassium acetate buffer) under stirred conditions was investigated both in the presence and absence of various sugar phosphate anions. In this case, potassium sugar phosphates free from inorganic phosphate were used so that the true effect of the anion could be observed apart from the inhibition of dissolution which the calcium and phosphate ions are known to produce.

The presence of these various potassium sugar phosphates in the solution reduced the rate of hydroxyapatite dissolution by respective factors which are given in Table 1.

TABLE 1

| Additive [1] | Factor |
|---|---|
| Nil | 1.00 |
| Dipotassium glucose 6-phosphate | 1.75 |
| Dipotassium glucose 1-phosphate | 1.75 |
| Tetrapotassium fructose 1:6-diphosphate | 2.00 |
| Dipotassium sucrose phosphate | 2.54 |

[1] Present in a concentration of $1.0 \times 10^{-2}$ molar.

The above two examples clearly show the efficacy of sugar phosphate salts, particularly calcium sugar phosphates, in inhibiting the dissolution of hydroxyapatite.

The onset of dental caries is signalled by subsurface decalcification of the enamel. This decalcification reduces the hardness of the dental surface as measured by conventional hardness tests (e.g. the Knoop technique). Thus, any compound which can be shown to deposit a material into decalcified softened enamel, thereby rehardening such enamel, must also possess cariostatic activity.

Example 3

Product (X), when incorporated at a concentration of 0.5% by weight in an aqueous test medium comprising lactic acid, was found to inhibit significantly the softening of polished dental enamel at a pH as low as 3.8.

Example 4

When polished dental enamel was immersed in a solution at pH of 4.5 (potassium acetate buffer) for 6 hours, softening was found to occur to the extent of 140 KHN units (Knoop Hardness Number). In similar solutions comprising 0.05% and 0.5% by weight of product (X), the corresponding degrees of softening after 6 hours were 52 KHN units and 20 KHN units, respectively.

Example 5

Pieces of polished dental enamel were softened in a preliminary step by immersing in a solution at pH of 4.5 (potassium acetate buffer), and were then immersed in slurries comprising dispersions of a conventional toothpaste in water incorporating a variety of additives (dispersion factor: 1 gram of toothpaste in 5 millilitres of water).

The toothpaste comprised the following components (parts by weight):

| | |
|---|---|
| Dibasic calcium phosphate | 40 |
| Glycerol | 16 |
| Sorbitol syrup | 10 |
| Gum tragacanth | 1.0 |
| Saccharin (soluble) | 0.1 |
| Sodium lauryl sulphate | 1.0 |
| Methyl parahydroxybenzoate | 0.1 |
| Water to make 100 parts by weight. | |

Table 2 gives the nature of the additive, the hardness after softening of respective pieces of enamel, the extent of this preliminary softening, and the extent of rehardening after immersion in the slurry. Hardness figures throughout this specification are given in KHN units.

TABLE 2

| Additive [1] | Hardness after softening | Decrease in hardness | Range of hardness increase |
|---|---|---|---|
| Nil | 206 | 133 | +2–+7 |
| 10% calcium nitrate | 201 | 121 | –1–+6 |
| 10% disodium hydrogen phosphate | 188 | 129 | +3–+6 |
| 10% dipotassium sucrose phosphates | 183 | 112 | +2–+6 |
| 10% calcium sucrose phosphates | 199 | 127 | +9–+20 |
| 5% Product (X) | 219 | 128 | +9–+15 |
| 10% Product (X) | 213 | 126 | +16–+26 |
| 20% Product (X) | 214 | 121 | +28–+35 |
| 20% Product (Y) | 183 | 150 | +15–+32 |

[1] Concentration of additive is expressed as a percentage by weight of the toothpaste.

Example 6

Pieces of polished dental enamel were treated as in Example 5 and the rate of rehardening was determined for three different concentrations of an additive consisting of product (X).

Table 3 gives the concentrations of the additive in the three slurries (i), (ii) and (iii), the hardness after softening of respective pieces of enamel, and the extent of this preliminary softening.

TABLE 3

| Product (X),[1] concentration in slurry | Hardness after softening | Decrease in hardness |
|---|---|---|
| (i) 5% | 213 | 140 |
| (ii) 10% | 235 | 100 |
| (iii) 20% | 215 | 30 |

[1] Concentration of product (X) is expressed as a percentage by weight of the toothpaste.

Table 4 gives the amount of rehardening which had occurred after different periods of immerison in the respective slurries. It is noticed that significant degrees of rehardening are achieved in all cases in short periods of time.

TABLE 4

| Slurry | Hardness increase for the time interval (minutes) | | | | | | | | | | |
|---|---|---|---|---|---|---|---|---|---|---|---|
| | 1 | 2 | 3 | 4 | 5 | 6 | 8 | 9 | 10 | 12 | 15 |
| (i) | | | | | | 8 | | 13 | | 11 | 14 | 12 |
| (ii) | | | | | | 6 | 13 | 16 | 22 | | 19 | 21 |
| (iii) | 8 | 12 | 28 | 34 | 35 | | | | | | 35 |

Example 7

When polished dental enamel, which had been softened in a preliminary step by immersing in a solution at pH of 4.5 (potassium acetate buffer), was immersed in aqueous solutions comprising product (X) or product (Z) at different concentrations within the range 1% to 20% by weight, it was found to be rehardened in all cases. Table 5 gives the nature of the additive, the hardness after softening of respective pieces of enamel, the extent of this preliminary softening, and the extent of subsequent rehardening.

TABLE 5

| Additive | Hardness after softening | Decrease in hardness | Range of hardness increase |
|---|---|---|---|
| Product (X): | | | |
| 20% | 213 | 100 | +30–+40 |
| 10% | 214 | 97 | +20–+30 |
| 5% | 231 | 91 | +20–+30 |
| 2% | 223 | 106 | +15–+25 |
| 1% | 229 | 112 | +15–+25 |
| Product (Z): | | | |
| 20% | 219 | 108 | +10–+25 |
| 2% | 261 | 59 | +10–+25 |

Example 8

When a human tooth, whose enamel had been slightly softened by the action of lactic acid, was immersed for six days in a solution of 1% by weight of product (X) in saliva, the enamel was found to be rehardened. Saliva in the absence of product (X) did not reharden a softened tooth.

Example 9

Pieces of polished dental metal were treated as in Example 5, except that slurries containing selected additives were made up with saliva (a composite from four people) instead of water.

Details of the additive and hardness determinations are given in Table 6.

TABLE 6

| Additive [1] | Hardness after softening | Decrease in hardness | Range of hardness increase |
|---|---|---|---|
| Nil | 220 | 115 | +6–+8 |
| 10% calcium nitrate | 231 | 117 | +16–+23 |
| 10% disodium hydrogen phosphate | 163 | 158 | +10–+20 |
| 10% dipotassium hydrogen phosphate | 190 | 136 | 0–+4 |
| 10% product (X) | 197 | 114 | +32–+37 |

[1] Concentration of additive is expressed as a percentage by weight of the toothpaste.

Example 10

Pieces of unsoftened polished dental enamel were brushed (electric toothbrush) with three materials: (i) distilled water, (ii) a solution consisting of 20% by weight product (X) in distilled water, (iii) a slurry consisting of a dispersion of 1 gram of conventional toothpaste in 5 milliliters of distilled water incorporating product (X). The amount of product (X) in the slurry was 20% by weight based on the weight of the toothpaste, and the toothpaste was the same as that described in Example 4.

Table 7 gives the initial hardness of the enamel, the hardness increase after different periods of brushing, and the observed range of hardness increase.

TABLE 7

| Material | Initial hardness | Hardness increase for time interval (minutes) | | | Range of hardness increase |
|---|---|---|---|---|---|
| | | 2 | 4 | 6 | |
| (i) | 357 | +2 | +6 | −8 | −8–+6 |
| (ii) | 323 | +20 | +10 | +24 | +10–+25 |
| (iii) | 313 | +42 | +31 | +42 | +30–+40 |

The effect of sugar phosphates on the decalcification and rehardening of dental enamel (demonstrated by the above experiments) indicates that the incidence of caries in caries-susceptible rats should be reduced either by brushing the teeth with a dentifrice incorporating the cariostatic agents of the invention or by feeding the rats with a foodstuff incorporating such agents. Examples 11 and 12 hereunder illustrate the validity of this hypothesis.

Example 11

It has been demonstrated that a toothpaste containing 10% by weight of product (X), brushed on the teeth of rats effected a reduction in the caries severity score of 27% compared with a control toothpaste not containing this agent (conventional toothpaste formula described in Example 5).

Example 12

An Osborne-Mendel strain of rats (these are susceptible to dental caries when fed on a diet high in refined carbohydrates) was used to test efficacy of these cariostatic agents in reducing the incidence of caries when added in various concentrations to the diet.

The basic diet was high in refined carbohydrate but was nutritionally adequate in phosphorus, and consisted of the following components (parts by weight):

| | |
|---|---|
| Sugar (sucrose) | 59 |
| Skimmed milk powder | 27 |
| Whole wheat flour | 6 |
| Alfafa | 3 |
| Liver powder | 4 |

All components of the diet were free from significant amounts of fluoride. When this diet was fed to control groups of rats over a period of about 6 weeks, the animals developed caries. The test groups of rats were given this basic diet, but with the addition thereto of various amounts of cariostatic agents selected from the group consisting of product (A), product (X) and product (Y).

Table 8 gives the results of three series of tests (each compared with the same control) carried out with the specified additive incorporated in the diet (1% by weight of total diet).

TABLE 8

| Additive | Reduction in smooth surface caries | Reduction in total caries |
|---|---|---|
| Product (A) | 89 | 25 |
| Product (X) | 65 | 21 |
| Product (Y) | 58 | 29 |

It is seen that all additives were cariostatic under these conditions in rats, the effect on smooth surface caries being greater than on caries occurring on occlusal surfaces.

Other cariostatic agents according to the invention which have been tested by in vitro experiments (as in, say, Example 3) or by in vivo experiments (as in, say, Example 12) include calcium sugar phosphates and the defined complex associations of calcium sugar phosphates and inorganic calcium phosphate where the sugar moiety is derived from a sugar belonging to the group: fructose, glucose, maltose and lactose. All of these agents have been shown to have an inhibiting effect either on the attack of lactic acid on human dental enamel or on the incidence of dental caries in caries-susceptible rats.

Example 13

Product (X) was incorporated to the extent of 5% by weight in the toothpaste described in Example 5, and the toothpaste was tested against a control toothpase not incorporating the additive in an extensive dentifrice trial with school children subjects. The proportion of decayed, missing or filled tooth surfaces for children using the toothpaste containing product (X) was found to be considerably less than the proportion for children using the control toothpaste (the differences between the test and control groups were statistically significant at the 0.1% level).

INCORPORATION IN CARIOGENIC CARRIERS

The cariostatic agents can be combined with cariogenic carriers in any convenient way (as solids or as solution), preferably ensuring that their distribution therein is as uniform as possible.

The agents can be combined with foodstuff carriers by being incorporated in the raw materials from which the foodstuff is made, or by being incorporated in an intermediate or finished product. Thus, they can be incorporated directly in sugar, flour and cereals (e.g. corn, wheat, oats, barley, soya) and various mixes (e.g. bread and cake mixes) which can then be used in the preparation of finished products (e.g. bread or cake) having cariostatic properties. They can also be incorporated directly in various confections, candies, beverages, syrups, canned foods, ice cream, gelatine or the like.

The preferred concentration of the agents in foodstuffs is in the range of 0.1 to 6.0% of the foodstuffs by weight. Higher concentrations than this in foodstuffs which are consumed as part of the normal diet are not necessary for protection against dental caries. However, higher concentrations can be used in edible pharmaceutical preparations (e.g. prophylactic tablets and lozenges for sucking).

The following examples illustrate the incorporation of the described product (X) in a variety of cariogenic carriers. Other cariostatic agents of the present invention can be incorporated similarly in the same carriers, and comparable methods can be used for incorporating such agents in alternative carriers.

Example (a): sugar

Sugar crystals were coated with product (X) to give a composition containing 1% by weight of the complex. This was done by various means such as: (i) spraying a solution of product (X) in water onto sugar crystals in a rotary drier; (ii) spraying the crystals with an aqueous solution of product (X) before discharging them from the centrifuges in the course of sugar manufacture; (iii) mixing dry sugar and product (X) in the presence of a fine spray of water.

Example (b): flour

1% by weight of powdered product (X) was blended with flour in a device for mixing dry substances.

Example (c): cereal

A breakfast cereal "corn flakes" was sprayed with a solution of product (X) in water. The flakes were then dried to produce a finished product containing 1% of product (X).

Example (d): bread

2% by weight of product (X) was added to flour during the mixing of ingredients for the manufacture of bread.

Example (e): cake mix

1% by weight of product (X) was added to the dry ingredients used in the preparation of a cake mix.

Example (f): liquid sugar

A liquid sugar was prepared comprising:

| | Percent by weight |
|---|---|
| Sucrose | 65.0 |
| Product (X) | 0.5 |
| Water | 34.5 |

Example (g): confectionery

In the preparation of a toffee mixture, 2% by weight of product (X) was added to the sugar ingredient.

Example (h): biscuits

In the preparation of a biscuit mixture, 2% by weight of product (X) was added to the dry ingredients during mixing.

Example (i): beverage

A beverage was prepared from liquid sugar in which 1% by weight of product (X) had been dissolved.

Example (j): tablet

A tablet was made containing 10% by weight of product (X) together with excipients such as sugar, flavouring matter and binding material.

INCORPORATION IN NON-CARIOGENIC CARRIERS

In the preparation of typical dentifrices and mouthwashes within the scope of the invention, the selected cariostatic agent is incorporated in the carrier in any suitable manner, depending on whether a powder, paste or liquid preparation is to be produced. Appropriate preparations of other ingredients (e.g. surface-active agents, binders, abrasives, flavouring materials and other excipients) are also incorporated in the carrier to achieve the required form of dentifrice or mouthwash.

The amount of cariostatic agent normally used in non-cariogenic carriers is generally such as to give a concentration of not less than 1% by weight of the total composition. There is no tolerance problem however, so that much higher concentrations can be employed with great success in dentifrices and mouthwashes.

We have found that a convenient abrasive usable in dentifrice preparations can be made by the further phosphorylation of product (X) to form a less soluble material, herein referred to as product (X'). This can be done by using additional quantities of phosphorus oxychloride and lime in the reaction previously described for preparing product (X); alternatively, the isolated product (X) can be further phosphorylated in solution in the presence of lime by the addition thereto of phosphorus oxychloride.

The resulting substance, product (X') consists of inorganic calcium phosphate and calcium sucrose phosphates but is considerably less soluble than product (X). We have also found that it has abrasive properties which make it suitable for use in dentifrices in conjunction with, or in place of, conventional dental abrasives such as dicalcium phosphate. The use of product (X') is illustrated below in Examples (n), (o), (r), (s), (t).

Example (k): toothpaste

A toothpaste was prepared having the following components (percentages by weight):

| | Percent |
|---|---|
| Product (X) | 5.0 |
| Gum tragacanth | 1.0 |
| Saccharin (soluble) | 0.1 |
| Glycerin (B.P.) | 20.0 |
| Sodium lauryl sulphate | 1.0 |
| Methyl parahydroxy benzoate | 0.1 |
| Flavour and colour | 1.0 |
| Dibasic calcium phosphate | 35.0 |
| Water | 36.8 |

The powdered gum tragacanth, methyl parahydroxy benzoate and flavour and colour components were dispersed in the glycerin. The saccharin, sodium lauryl sulphate and product (X) components were dissolved in part of the water, and this aqueous solution was added to the glycerin dispersion and thoroughly mixed. To this mixture was then added, again with thorough mixing, the calcium phosphate component which had been "wet out" previously in the remaining water.

Example (l): tooth paste

A preparation as set out in Example (k) was repeated but incorporating 2% by weight of sodium fluoride.

Example (m): tooth paste

A preparation as set out in Example (k) was repeated but incorporating 0.4% by weight of stannous fluoride.

Example (n): tooth paste

A preparation as set out in Example (k) was repeated but with all of the dibasic calcium phosphate replaced by an equal weight of product (X').

Example (o): tooth paste

A preparation as set out in Example (k) was repeated but with 50% by weight of the dibasic calcium phosphate replaced by an equal weight of product (X').

Example (p): tooth powder

The following preparation was made (percentages by weight):

| | Percent |
|---|---|
| Product (X) | 5.0 |
| Saccharin (soluble) | 0.1 |
| Colour agent | Trace |
| Dibasic calcium phosphate | 94.9 |

Example (q): tooth powder

A preparation as set out in Example (p) was repeated but incorporating 1% by weight of sodium fluoride.

Example (r): tooth powder

A preparation was made consisting of the following components (percentages by weight):

| | Percent |
|---|---|
| Colour | Trace |
| Saccharin (soluble) | 0.1 |
| Flavouring | Trace |
| Product (X) | 5 |
| Product (X') | 94.9 |

Example (s): liquid dentifrice

A preparation was made consisting of the following components (percentages by weight):

| | Percent |
|---|---|
| Sodium alginate | 1.5 |
| Product (X') | 5.0 |
| Sodium lauryl sulphate | 1.0 |
| Product (X) | 5.0 |
| Flavouring | Trace |
| Colouring | Trace |
| Water | 87.5 |

The colouring matter and flavouring were added to product (X') which, together with the alginate, was then dispersed in water containing the lauryl sulphate. Product (X) was added and the dispersion was diluted with water to the correct volume. The pH value was adjusted to 6.0.

Example (t): liquid dentifrice

A preparation as set out in example (s) was repeated, but incorporating 0.5% sodium fluoride by weight.

It is obvious that the above twenty examples are illustrative only of the possible variations of which compositions of matter according to the invention are susceptible and are in no way exhaustive of the innumerable combinations of subject cariostatic agents and conventional cariogenic or non-cariogenic carriers which it is possible to provide.

We claim:

1. A method of inhibiting dental erosion and dental caries comprising applying to the teeth an orally acceptable composition of matter comprising at least 1.0%, by weight of the composition, of a soluble, non-toxic and palatable cariostatic agent in intimate admixture with an orally acceptable carrier therefor; said cariostatic agent being a complex association of two components (a) and (b) of which component (a) is calcium sugar phosphate selected from the group consisting of a calcium sucrose phosphate, a mixture of calcium sucrose phosphates, a calcium glucose phosphate and a mixture of calcium glucose phosphates and component (b) is calcium orthophosphate and the association is such that at least 2% by weight of component (b) based on the weight of component (a) is soluble in water under ambient conditions when the total dissolved calcium sugar phosphate and the calcium orthophosphate exceeds about 5 parts per 100 parts water by weight.

2. A method of inhibiting dental erosion and dental caries according to claim 1, wherein component (a) is a calcium sucrose phosphate.

3. A method of inhibiting dental erosion and dental caries according to claim 1, wherein component (a) is a calcium glucose phosphate.

4. A method of inhibiting dental erosion and dental caries according to claim 1, wherein said cariostatic agent is a complex association of two components (a) and (b) of which component (a) is a mixture of calcium sucrose phosphates and component (b) is calcium orthophosphate and the association is such that at least 2% by weight of component (b) based on the weight of component (a) is soluble in water under ambient conditions when the total dissolved mixture of calcium sucrose phosphates and the calcium orthophosphate exceeds about 5 parts per 100 parts water by weight.

5. A method of inhibiting dental erosion and dental caries according to claim 1, wherein said cariostatic agent is a complex association of two components (a) and (b) of which component (a) is a mixture of calcium glucose phosphates and component (b) is calcium orthophosphate and the association is such that at least 2% by weight of component (b) based on the weight of component (a) is soluble in water under ambient conditions when the total dissolved mixture of calcium glucose phosphates and the calcium orthophosphate exceeds about 5 parts per 100 parts water by weight.

6. An orally acceptable composition of matter comprising from 1.0% to 6.0 by weight of a soluble, non-toxic and palatable cariostatic agent in intimate admixture with a food-stuff carrier therefor; said cariostatic agent being a complex association of two components (a) and (b) of which component (a) is calcium sugar phosphate selected from the group consisting of a calcium sucrose phosphate, a mixture of calcium sucrose phosphates, a calcium glucose phosphate and a mixture of calcium glucose phosphates and component (b) is calcium orthophosphate and the association is such that at least 2% by weight of component (b) based on the weight of component (a) is soluble in water under ambient conditions when the total dissolved calcium sugar phosphate and the calcium orthophosphate exceeds about 5 parts per 100 parts water by weight.

7. An orally acceptable composition of matter according to claim 6, wherein component (a) is a calcium sucrose phosphate.

8. An orally acceptable composition of matter according to claim 6, wherein component (a) is a calcium glucose phosphate.

9. An orally acceptable composition of matter according to claim 6, wherein said cariostatic agent is a complex association of two components (a) and (b) of which component (a) is a mixture of calcium sucrose phosphates and component (b) is calcium orthophosphate and the association is such that at least 2% by weight of component (b) based on the weight of component (a) is soluble in water under ambient conditions when the total dissolved mixture of calcium sucrose phosphates and the calcium orthophosphate exceeds about 5 parts per 100 parts water by weight.

10. An orally acceptable composition of matter according to claim 6, wherein said cariostatic agent is a complex association of two components (a) and (b) of which component (a) is a mixture of calcium glucose phosphates and component (b) is calcium orthophosphate and the association is such that at least 2% by weight of component (b) based on the weight of component (a) is soluble in water under ambient conditions when the total dissolved mixture of calcium glucose phosphates and the calcium orthophosphate exceeds about 5 parts per 100 parts water by weight.

11. An orally acceptabe composition of matter comprising at least 1.0% by weight of a soluble, non-toxic and palatable amount of a cariostatic agent in intimate admixture with an orally acceptable carrier therefor; said cariostatic agent being a complex association of two components (a) and (b) of which component (a) is calcium sugar phosphate selected from the group consisting of a calcium sucrose phosphate, a mixture of calcium sucrose phosphates, a calcium glucose phosphate and a mixture of calcium glucose phosphates and component (b) is calcium orthophosphate and the association is such that at least 2% by weight of component (b) based on the weight of component (a) is soluble in water under ambient conditions when the total dissolved calcium sugar phosphate and the calcium orthophosphate exceeds about 5 parts per 100 parts water by weight.

12. An orally acceptable composition of matter according to claim 11, wherein component (a) is a calcium sucrose phosphate.

13. An orally acceptable composition of matter according to claim 11, wherein component (a) is a calcium glucose phosphate.

14. An orally acceptable composition of matter according to claim 11, wherein said cariostatic agent is a complex association of two components (a) and (b) of which component (a) is a mixture of calcium sucrose phosphates and component (b) is calcium orthophosphate and the association is such that at least 2% by weight of component (b) based on the weight of component (a) is soluble in water under ambient conditions when the total dissolved mixture of calcium sucrose phosphate and the calcium orthophosphate exceeds about 5 parts per 100 parts water by weight.

15. An orally acceptable composition of matter according to claim 11, wherein said cariostatic agent is a complex association of two components (a) and (b) of which component (a) is a mixture of calcium glucose phosphates and component (b) is calcium orthophosphate and the association is such that at least 2% by weight of component (b) based on the weight of component (a) is soluble in water under ambient conditions when the total dissolved mixture of calcium glucose phosphates and the calcium orthophosphate exceeds about 5 parts per 100 parts water by weight.

References Cited

UNITED STATES PATENTS 3,375,168   3/1968   Curtin et al. _____ 167—93

FOREIGN PATENTS 256,211   7/1964   Australia.
572,352   10/1945   Great Britain.

OTHER REFERENCES

Accepted Dental Remedies, 32nd Ed., published by American Dental Association, Chicago, 1967, p. 56.

Hackh: Chemical Dictionary, 3rd Ed., published by McGraw-Hill Book Co., Inc., New York, 1944, p. 442.

McClure: Journal of the American Dental Association, vol. 62, pp. 511–515, May 1961.

Sugar Phosphates and Some Closely Related Substances, published by the British Drug House Ltd., Poole, England, 1958, p. 6.

RICHARD L. HUFF, Primary Examiner

U.S. Cl. X.R.

424—180